(12) United States Patent
Zander et al.

(10) Patent No.: US 11,400,904 B2
(45) Date of Patent: Aug. 2, 2022

(54) PRESSURE MEDIUM ASSEMBLY

(71) Applicant: Robert Bosch GmbH, Stuttgart (DE)

(72) Inventors: Thomas Zander, Oberstaufen (DE); Michael Loeffler, Oberstaufen (DE)

(73) Assignee: Robert Bosch GmbH, Stuttgart (DE)

( * ) Notice: Subject to any disclaimer, the term of this patent is extended or adjusted under 35 U.S.C. 154(b) by 195 days.

(21) Appl. No.: 16/618,320

(22) PCT Filed: Apr. 27, 2018

(86) PCT No.: PCT/EP2018/060902
§ 371 (c)(1),
(2) Date: Nov. 29, 2019

(87) PCT Pub. No.: WO2019/011498
PCT Pub. Date: Jan. 17, 2019

(65) Prior Publication Data
US 2020/0122699 A1    Apr. 23, 2020

(30) Foreign Application Priority Data

Jul. 12, 2017    (DE) .................... 10 2017 211 898.9

(51) Int. Cl.
*B60T 17/02*    (2006.01)
*B60T 8/40*    (2006.01)
*B60T 13/68*    (2006.01)

(52) U.S. Cl.
CPC ............ *B60T 8/404* (2013.01); *B60T 13/686* (2013.01); *B60T 17/02* (2013.01); *B60T 2270/10* (2013.01)

(58) Field of Classification Search
CPC ......... B60T 8/3675; B60T 8/368; B60T 17/02
(Continued)

(56) References Cited

U.S. PATENT DOCUMENTS 6,250,724 B1 * 6/2001 Shimizu .................. B60T 8/368
                                                  303/119.2
6,616,248 B2 * 9/2003 Obuse ..................... B60T 8/368
                                                  303/119.3
(Continued)

FOREIGN PATENT DOCUMENTS

DE    38 1 0 788 A1    10/1989
DE    41 33 879 A1    4/1993
(Continued)

OTHER PUBLICATIONS

International Search Report corresponding to PCT Application No. PCT/EP2018/060902, dated Aug. 1, 2018 (German and English language document) (7 pages).

*Primary Examiner* — Bradley T King
(74) *Attorney, Agent, or Firm* — Maginot, Moore & Beck LLP

(57) ABSTRACT

A pressure medium assembly, in particular for providing and regulating a pressure in a brake circuit of a slip-controllable brake system of a motor vehicle, includes a housing block and an electronic controller. The housing block includes a pump configured to be actuated by a drive motor and a valve, which are actuated by the controller. The controller is secured to an outer face of the housing block and has a device flange that is paired with a housing flange formed on the housing block. The flanges fix the housing block and the controller together. The housing flange protrudes radially outwards relative to a housing block peripheral side facing the housing flange such that the entire upper face of the housing block is available for a controller housing. This configuration additionally allows the use of a printed circuit board which is free of open recesses on the peripheral side.

10 Claims, 4 Drawing Sheets

(58) Field of Classification Search
USPC .......................................... 303/119.3, DIG. 10
See application file for complete search history.

(56) References Cited

U.S. PATENT DOCUMENTS

| | | | | |
|---|---|---|---|---|
| 6,969,128 B2* | 11/2005 | Sekihara | ................ | B60T 8/368 |
| | | | | 303/113.1 |
| 7,967,395 B2* | 6/2011 | Sakai | .................... | B60T 8/368 |
| | | | | 303/119.3 |
| 8,783,794 B2* | 7/2014 | Iyatani | .................... | B60T 8/17 |
| | | | | 303/119.3 |
| 2005/0057093 A1* | 3/2005 | Segawa | .................. | B60T 8/368 |
| | | | | 303/119.3 |
| 2011/0259005 A1* | 10/2011 | Kikuchi | ............... | B60T 13/662 |
| | | | | 60/545 |
| 2012/0267946 A1 | 10/2012 | Ogawa et al. | | |
| 2014/0298797 A1* | 10/2014 | Murayama | ............. | B60T 11/16 |
| | | | | 60/533 |
| 2015/0274138 A1* | 10/2015 | Heise | ....................... | B60T 7/12 |
| | | | | 361/752 |
| 2016/0262257 A1* | 9/2016 | Watanabe | .............. | B60T 13/74 |
| 2016/0264114 A1* | 9/2016 | Maruo | .................. | B60T 13/686 |

FOREIGN PATENT DOCUMENTS

| | | |
|---|---|---|
| DE | 10 2004 044 730 A1 | 5/2005 |
| DE | 11 2009 003 622 T5 | 5/2012 |
| JP | H9-109856 A | 4/1997 |
| JP | 2005-88753 A | 4/2005 |
| JP | 2016-35985 A | 3/2016 |
| JP | 2017-94816 A | 6/2017 |
| KR | 10-2017-0079745 A | 7/2017 |

\* cited by examiner

PRESSURE MEDIUM ASSEMBLY

This application is a 35 U.S.C. § 371 National Stage Application of PCT/EP2018/060902, filed on Apr. 27, 2018, which claims the benefit of priority to Serial No. DE 10 2017 211 898.9, filed on Jul. 12, 2017 in Germany, the disclosures of which are incorporated herein by reference in their entirety.

BACKGROUND

The disclosure is based on a pressure medium assembly, in particular for providing and regulating pressure in a braking circuit of a slip-controllable braking system of a motor vehicle.

Pressure medium assemblies of this kind are already known from the prior art, for example from DE 41 33 879 A1. This pressure medium assembly is fitted with a housing block on which pumps which are indirectly actuated by an electronically actuable motor and electronically actuable valves, among other things, are arranged and are in contact with one another in a pressure medium-conducting manner. In addition, an electronic control unit is present which performs actuation of the motor and the valves. This control unit is fastened to one of the outer sides of the housing block and has a control unit housing for this purpose. Said control unit housing is provided with recesses along its circumference, on the base whereof facing the housing block unit flanges are formed. These unit flanges rest against counter-flanges of the housing block. The control unit is fixed to the housing block via a fastening means arranged in the region of the flanges assigned to one another.

The disadvantage of the known connection between the housing block and the electronic control unit is that the installation space of the flanges extends in the potential extension region of an electrical printed circuit board received in the control unit housing. The printed circuit board is therefore likewise provided with recesses on the circumferential side, in order to create space for access to the unit flanges. However, the dimensions of the flanges occupy a relatively large area, among other things in order to allow machine assembly of the fastening elements in the flange region and, for example, in order to accommodate a sealing of the control unit in respect of the environment in this flange region. On the one hand, the available printed circuit board area is limited due to the recesses on the circumferential side and therefore the positioning of electronic components or strip conductors required for brake control between these components is made difficult, in addition to which the production costs of a printed circuit board increase because these recesses have to be produced by mechanical reworking of the printed circuit board and therefore generate disposal costs for the printed circuit board material that has been removed. Moreover, assembly of the printed circuit board in the control unit housing requires a more careful reciprocal centering of the components relative to one another because damage or the introduction of mechanical tensions in the printed circuit board have to be avoided for reasons of functional safety and service life.

SUMMARY

According to the features of the disclosure, the inventive pressure medium assembly has, on the one hand, the advantage that at least the entire surface of an upper side of the housing block is available for the printed circuit board of the electronic control unit. In addition, the printed circuit board as such can be produced more cost-effectively, as it has straight running sides and does not therefore require the subsequent addition of recesses. The control unit can then be fastened to the housing block from the drive motor side, as a result of which the size of the printed circuit board can be determined independently of the arrangement and dimensions of the existing unit flanges. Even printed circuit boards with a larger area than the base area of the housing block can be realized. Removing the restriction of the printed circuit board surface on the base area of the housing block allows more complex circuits with a greater number of electronic components and strip conductors to be implemented.

According to the disclosure, a housing flange used for fastening the control unit housing projects radially outwards for this purpose in respect of a circumferential side of the housing block exhibiting this housing flange.

Further advantages or advantageous developments of the disclosure result from the dependent claims and the following description.

Advantageously, a housing flange used for fastening the control unit housing is formed on an attachment which can be fastened to the housing block. This attachment can be sized in an application-specific manner and integrated in an existing modular system, i.e. differently designed control unit housings can be fastened to differently designed housing blocks without substantial additional expenditure. The attachments may be anchored to the housing block in a different way, for example by pressing-in, screwing or caulking.

Fastening means which are self-tapping and therefore generate lower assembly costs can be used to anchor the control unit housing to the flange on the housing block side, as housing flanges formed on attachments reduce the risk of chips produced during fixing being able to get into the inside of the control unit housing.

Threaded holes formed at the flange on the control unit side allow the fastening means to be introduced into the flange and firmly screwed from the side of the housing block or the drive motor. In this way, the residual risk of chips penetrating the inside of the control unit is further reduced.

BRIEF DESCRIPTION OF THE DRAWINGS

An exemplary embodiment of the disclosure is explained in detail in the following description and depicted in the drawings.

Components which correspond to one another are each denoted in the individual figures using standard reference numbers.

DETAILED DESCRIPTION

Figure 1:
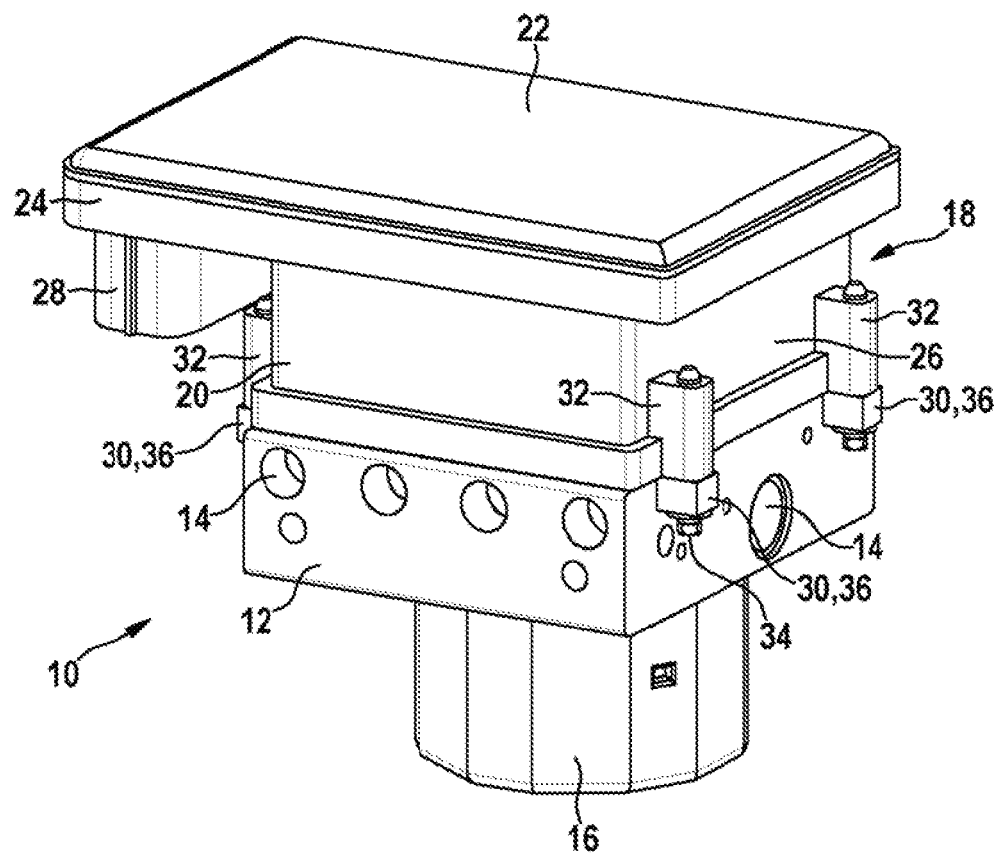
FIG. 1 shows an exemplary embodiment of the disclosure with the help of a perspective representation of the pressure medium assembly.
Figure 2:
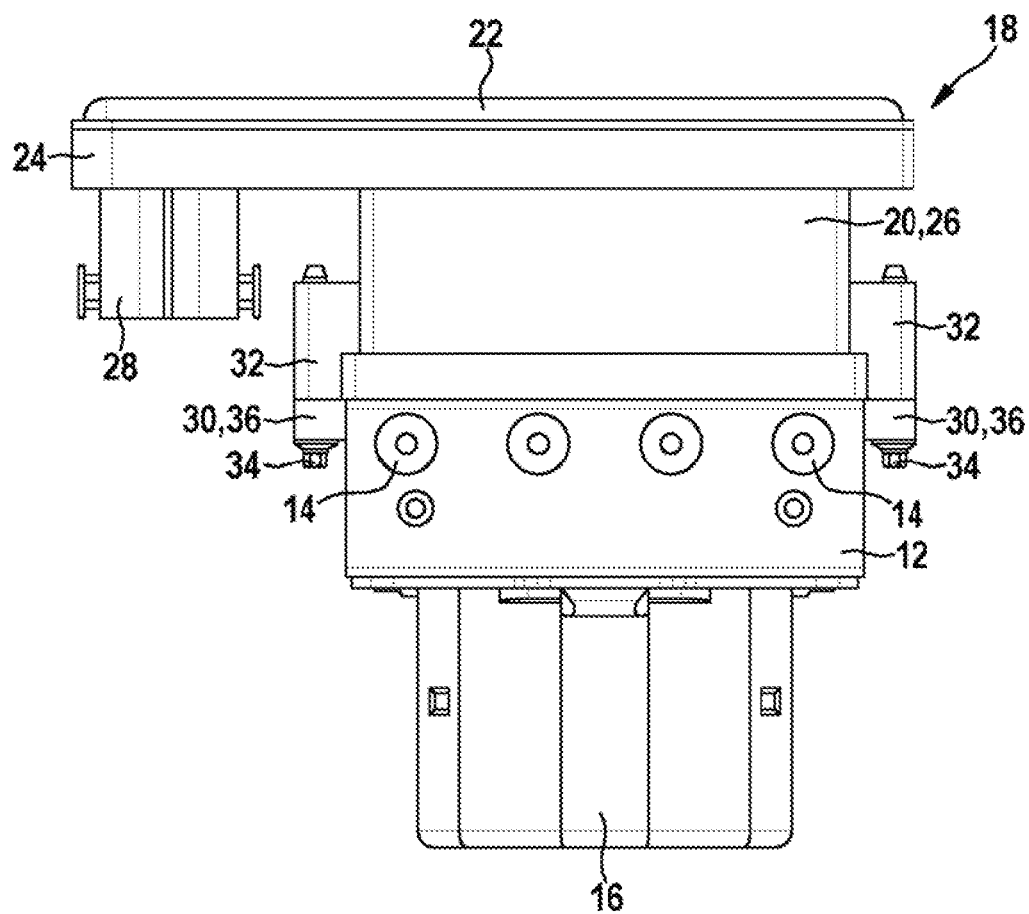
FIG. 2 once again shows the exemplary embodiment according to FIG. 1 in side view.

The pressure medium assembly 10 shown in FIGS. 1 and 2 is composed of a box-shaped housing block 12 with openings 14 formed on the circumferential sides thereof for connecting brake lines and for receiving pump elements, for example, a drive motor 16 attached to an underside of this housing block 12, and an electronic control unit 18 attached to the upper side of the housing block 12 with a likewise box-shaped control unit housing 20. This control unit housing 20 extends over the entire upper side of the housing block 12 and ends approximately flush with the circumferential sides of the housing block 12. The control unit housing 20 is closed by a cover 22 on its outer side facing away from the housing block 12. Below this cover 22, inside the control unit housing 20, not visible in the figures, is arranged a printed circuit board fitted with electronic components and supporting strip conductors, via which different actuators, for example magnetic coils which are arranged in a part of the control unit housing 20 on the housing block side, are in electrical contact. The drive motor 16 which is arranged on the lower side of the housing block 12 opposite the control unit housing 20 is also attached to the printed circuit board (not shown) via contact springs which are conducted through a bushing in the housing block 12.

A first portion 24 of the control unit housing 20 further from the housing block 12 receives the aforementioned printed circuit board and thereby occupies a base area, for example, which is larger than a second portion 26 of the control unit housing 20 which receives the aforementioned actuators and extends over the entire upper side of the housing block 12. Accordingly, the control unit housing 20 has a circumferential step at which the two housing portions 24; 26 are connected to one another or merge into one another. The first portion 24 of the control unit housing 20 projects in a circumferential manner in respect of the second portion 26 and therefore also in respect of the housing block 12, wherein this projection is roughly the same size on three of the four circumferential sides of the control unit housing 20, for example, while it is larger on the fourth side and creates space for a socket 28 of a unit plug that can be inserted from outside. This socket 28 extends downwardly in the figures, i.e. from the first portion of the control unit housing 20 towards the housing block 12.

The control unit housing 20 is fastened to the housing block 12 at housing flanges 30. These housing flanges 30 are arranged by way of example on two circumferential sides of the housing block 12 lying opposite one another and project radially outwardly in respect of these circumferential sides. The number of existing housing flanges 30 and also the distribution thereof over the circumferential faces of the housing block 12 can be selected in an application-specific manner and is in no way tied to the exemplary embodiment shown. Unit flanges formed on the control unit housing 20 and which likewise project radially outwards in respect of the second portion 26 of this control unit housing 20 are assigned to the housing flanges 30. Screws 34 are used for the mutual fixing of the control unit housing 20 and the housing block 12 in the exemplary embodiment, wherein a screw 34 is provided in the region of each of the flanges 30; 32. These screws 34 lie with a screw head on the end face of a housing flange 30 and are screwed with a threaded portion of their shaft into the associated unit flange 32 of the control unit housing 20. A screw connection can therefore be made using screw spindles which act upon the screw head from the side of the drive motor 16. This screwing direction offers the advantage that the first portion 24 of the control unit housing 20, in other words the portion receiving the printed circuit board, can cover these housing flanges 30 without recesses having to be provided in the control unit housing 20 and/or printed circuit board, in order to allow screwing tools to access the screws 34. Correspondingly sized rectangular printed circuit boards with continuous, unrecessed outer sides can be accommodated in the first portion 24 of the control unit housing 20.

In the exemplary embodiment shown, screws 34 are used to fasten the control unit housing 20 to the housing block 12, as explained.

Optionally, screws 34 with a self-tapping thread can be used for this purpose, in order to save threaded holes having to be provided in the unit flange 32. Alternatively, the control unit housing 20 can also be fastened to the housing block 12 in a force-fitting manner, for example using pressing pins or rivets, if an unwanted, non-destructive severing of this connection is to be prevented.

The housing flanges 30 may be formed integrally with the housing block 12 in each case. However, it is more advantageous by comparison for a housing flange 30 to be configured as a separate, block-shaped attachment 36 and for this attachment to be fastened to the housing block 12. This facilitates cost-effective production of the housing block as an extruded part and makes it possible, at no extra cost, for differently designed or sized attachments 36 to be provided in the necessary number and position on different pressure medium assemblies 10 according to the specific application in each case and therefore for an assembly modular system to be produced. Multiple exemplary embodiments of attachments 36 of this kind are depicted in FIGS. 3a to 3d.

Figure 3A:
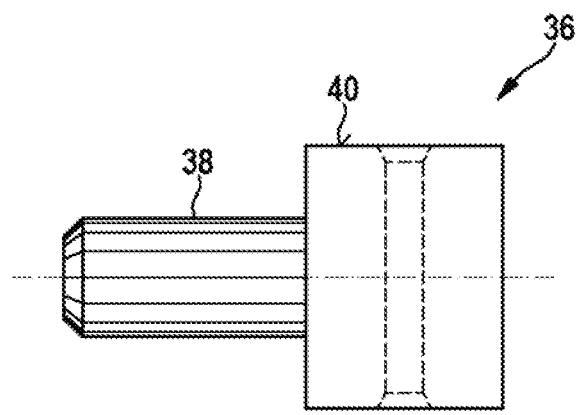
FIG. 3 shows a total of 4 different design variants of an attachment forming a housing flange.

There are various possible ways of attaching the attachments 36 to the housing block 12:

For example, the attachments 36 are fitted with at least one cylindrical journal 38 which extends in an approximately radial extension of a flange surface 40 over said flange surface 40 and allows the attachment 36 to be anchored in an opening 14 provided for this purpose on one of the circumferential sides of the housing block 12. The anchoring as such may be formed depending on the structural embodiment of the journal 38 in a force-fitting and/or form-fitting manner, for example as a press-fit, screwed or caulking connection. In the case of a press-fit connection, the journal 38 of the attachment may be provided on the circumferential side with press-in webs running in the longitudinal direction of the journal and press-in grooves disposed between these press-in webs, as shown in FIG. 3a.

Figure 3B:
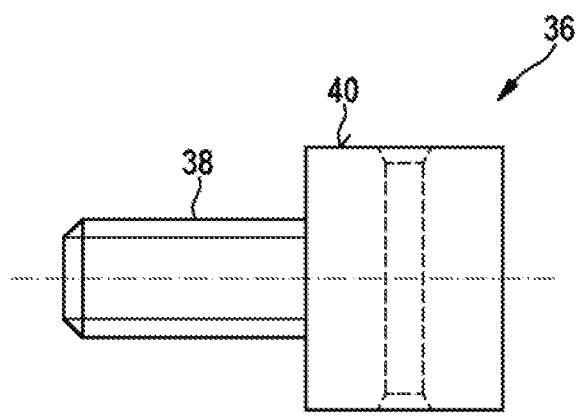
Figure 3C:
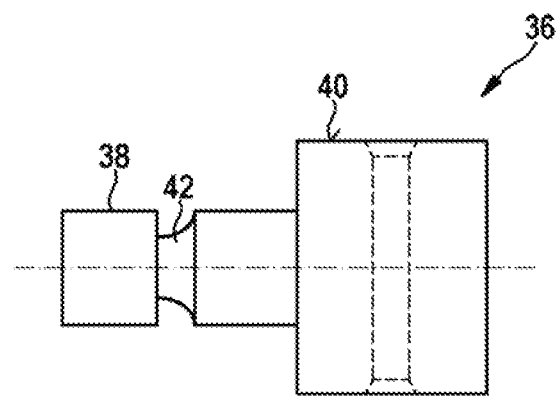

Alternatively, the journal of the attachment 36 may also be provided with an outer thread, as depicted in FIG. 3b. In this case, the attachment 36 can be screwed via its journal 38 into an opening 14 provided with an internal thread on the circumferential side of a housing block 12. Furthermore, the attachment 36 may be fitted with a journal 38 which can be anchored in a form-fitting manner by caulking at the housing block 12. For this purpose, the journal 38 is provided with at least one constriction 42 forming an undercut along its circumference (FIG. 3c) in which following the introduction of this journal 38 into the associated opening 14 with the help of a caulking tool, surrounding material of the housing block 12 is forced in.

Figure 3D:
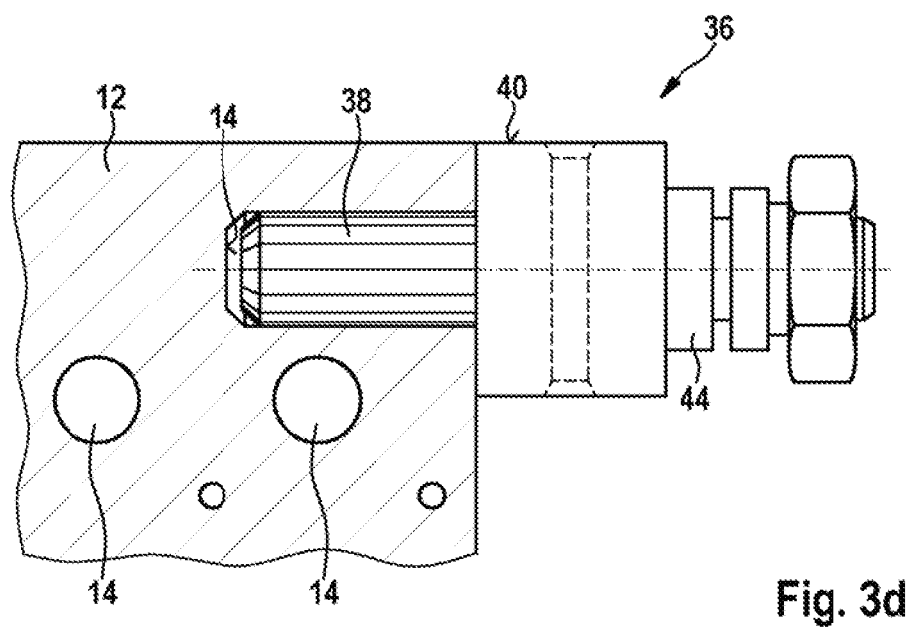

Furthermore, attachments 36 that can be anchored to the housing block 12 can also be developed for fixing the pressure medium assembly 10 in a mount of a motor vehicle on the car body side, as shown in FIG. 3d. For this purpose, the attachment 36 is provided with a portion projecting outwardly in respect of the housing block 12 which is configured in such a manner that it can engage with an associated contour on a mount on the vehicle side or which is adapted to receive a molded component 44 enclosed between the mount and the attachment. This molded component 44 is ideally made of elastomer and can be mechanically pretensioned following assembly of the pressure medium assembly on the mount, in order to dampen a transmission of vibrations on the vehicle side to the pressure medium assembly simultaneously with the suspension of the pressure medium assembly on the holder of the vehicle.

Self-evidently, still further changes or additions are conceivable without deviating from the basic idea underlying the disclosure.

The invention claimed is:

1. A pressure medium assembly, comprising:
   a housing block on which a pump configured to be actuated by an electronically actuable motor and an electronically actuable valve are arranged and are in contact with one another in a pressure medium-conducting manner;
   an electronic control unit configured to actuate the motor and the valve, the control unit fitted with a control unit housing having a unit flange that projects outwardly from an outer surface of the control unit housing in a first direction; and
   a housing flange that interacts with the unit flange so as to fasten the control unit to the housing block, the housing flange projecting outwardly from an outer side surface of the housing block in the first direction,
   wherein the housing flange is formed as an attachment arranged on the outer side surface of the housing block, and
   wherein the attachment is anchored on the circumferential side of the housing block in a force-fitting and/or form-fitting manner.

2. The pressure medium assembly as claimed in claim 1, further comprising:
   a fastening member received in each of the unit flange and the housing flange so as to fixedly connect the control unit to the housing block.

3. The pressure medium assembly as claimed in claim 2, wherein the fastening member is a screw.

4. The pressure medium assembly as claimed in claim 3, wherein one of the unit flange and the housing flange includes a through-hole and the other of the unit flange and the housing flange has a threaded hole.

5. The pressure medium assembly as claimed in claim 4, wherein the unit flange has the threaded hole and the housing flange has the through-hole.

6. The pressure medium assembly as claimed in claim 1, wherein the pressure medium assembly is configured to provide and regulate pressure in a braking circuit of a slip-controllable braking system of a motor vehicle.

7. The pressure medium assembly as claimed in claim 3, wherein the screw has a self-tapping thread.

8. The pressure medium assembly as claimed in claim 2, wherein the electronically actuable motor defines an axial direction, and the fastening member extends in the axial direction.

9. A pressure medium assembly, comprising:
   a housing block on which a pump configured to be actuated by an electronically actuable motor and an electronically actuable valve are arranged and are in contact with one another in a pressure medium-conducting manner;
   an electronic control unit configured to actuate the motor and the valve, the control unit fitted with a control unit housing having a unit flange that projects outwardly from an outer surface of the control unit housing in a first direction; and
   a housing flange that interacts with the unit flange so as to fasten the control unit to the housing block, the housing flange projecting outwardly from an outer side surface of the housing block in the first direction,
   wherein the housing flange is formed as an attachment arranged on the outer side surface of the housing block, and
   wherein the attachment includes a journal, and the outer side surface of the housing block defines an opening in which the journal is received.

10. The pressure medium assembly as claimed in claim 9, wherein the journal is caulked, screwed, or pressed into the opening in the outer side surface of the housing block.

* * * * *